June 1, 1943. J. L. BETZEN 2,320,557
ROTARY GRAIN THRESHING MACHINE
Filed Oct. 26, 1942 3 Sheets-Sheet 1

INVENTOR.
JOHN L. BETZEN
BY E. G. Charles
ATTORNEY.

June 1, 1943. J. L. BETZEN 2,320,557
ROTARY GRAIN THRESHING MACHINE
Filed Oct. 26, 1942 3 Sheets-Sheet 2

INVENTOR
JOHN L. BETZEN
BY U. G. Charles
ATTORNEY

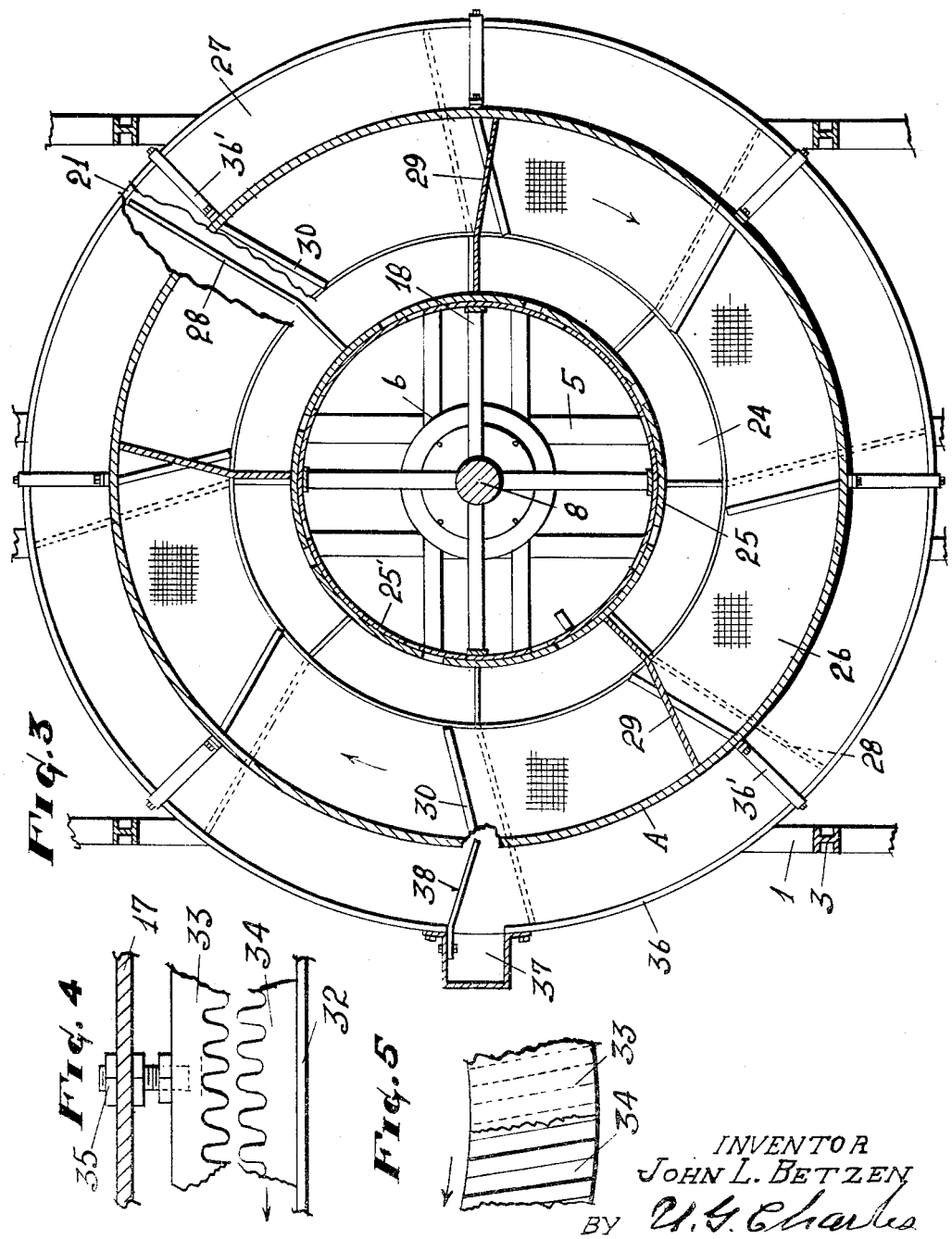

Patented June 1, 1943

2,320,557

UNITED STATES PATENT OFFICE 2,320,557

ROTARY GRAIN THRESHING MACHINE

John L. Betzen, Wichita, Kans.

Application October 26, 1942, Serial No. 463,331

3 Claims. (Cl. 130—27)

My invention relates to a rotary grain threshing machine and has for its principal object to separate grain from straw by rotary movement. A further object of this invention is to provide a machine having means that when the grain is separated from the straw and chaff, the grain is discharged by centrifugal force to a point of exit while the straw and chaff is likewise centrifugally discharged from an annular exit below the grain discharged, and the component parts of the machine being few in number easily constructed, assembled, and of long duration due to non-reciprocating movements among the components.

A still further object of this invention is to construct a rotary threshing machine capacitated to shred the straw to a greater degree than heretofore accomplished by other threshing machines whereby in the event of the rotary threshing machine being carried by a portable structure functioning as a combine, the straw is easily turned under at the time of breaking the ground for another crop.

A still further object of this invention is to construct a rotary threshing machine whose capacity of separating the grain from the straw is greater than the usual threshing cylinder, the accomplishment of which is through the medium of a pair of annular toothed elements between which the grain heads and straw will pass and being rubbed instead of being combed.

A still further object of this invention is to provide a pre-thresher in the machine preparatory to discharging the mass of straw into and through the toothed elements that are annularly disposed and adapted to function as a final threshing to separate the grain from the straw.

A still further object of this invention is to construct a threshing machine that has the capacity of shredding bundles of wheat sufficient to remove all of the heads from the bundle to eliminate the remainder of the straw from passing through the machine, and likewise for other kind of grain such as bundles of kafir corn, cane, or the like.

These and other objects will hereinafter be more fully described, reference being had to the accompanying drawings forming a part of this specification, and in which like characters will apply to like parts in the different views.

Referring to the drawings:

Fig. 3 is a sectional view taken on line 3—3 in Fig. 1, parts removed for convenience of illustration.

Fig. 4 is an enlarged fragmentary exterior view of the annular toothed arrangement of the machine.

Fig. 5 is a fragmentary plan view of Fig. 4, showing the angle of the teeth.

Figure 1:
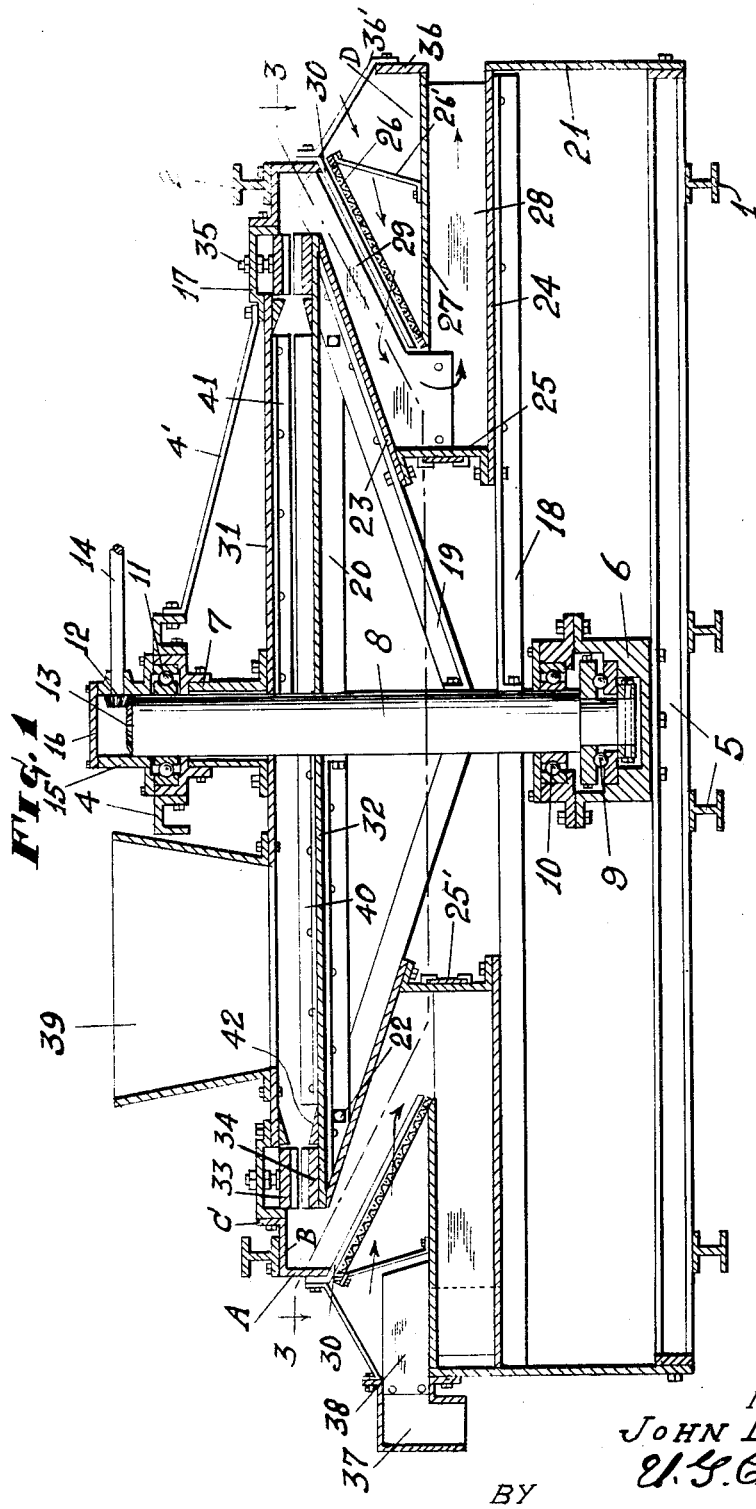
Fig. 1 is an enlarged diametrical section through the machine.
Figure 2:
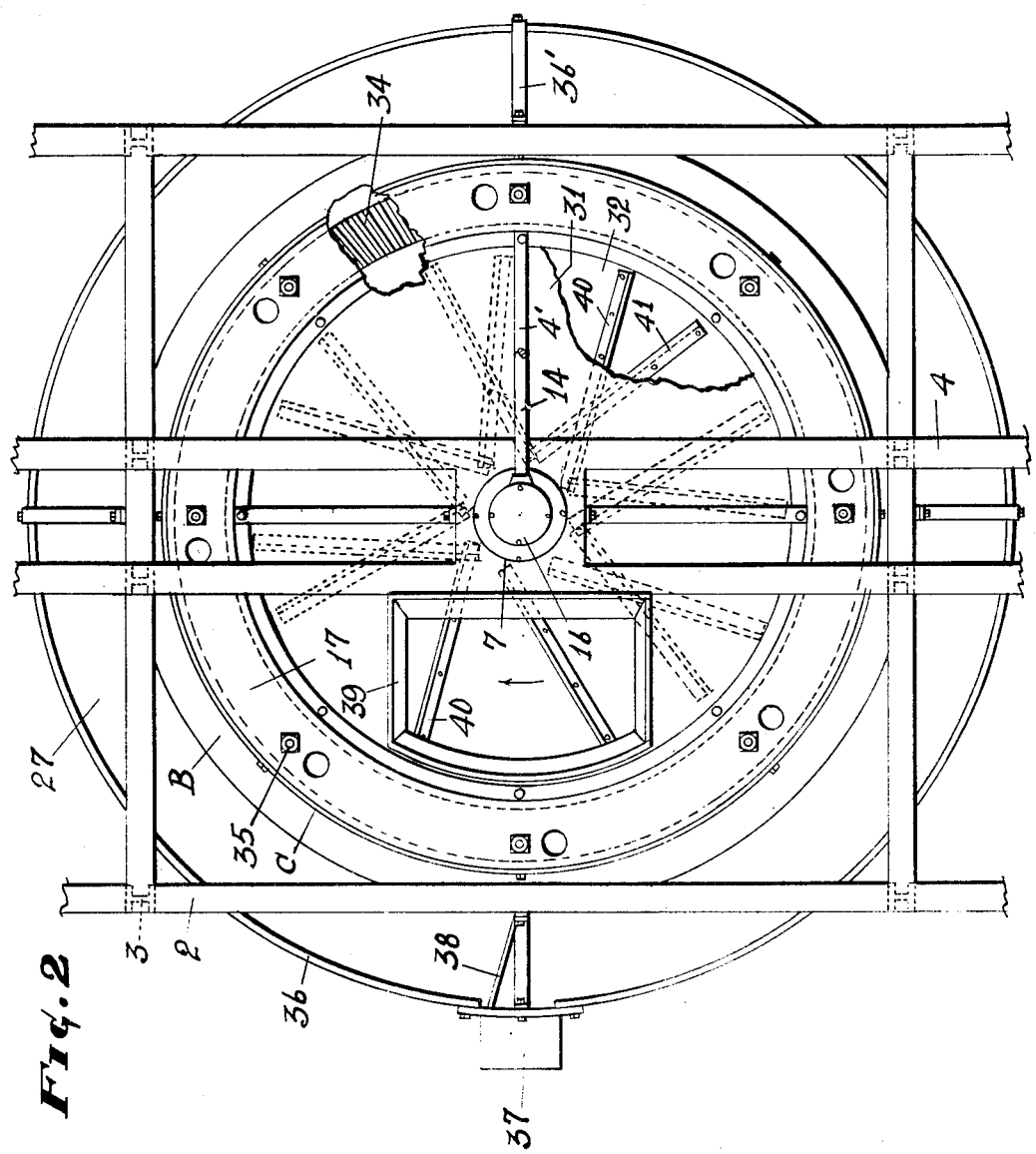
Fig. 2 is a plan view of the machine, parts removed for convenience of illustration.

The invention herein disclosed consists of a rotary threshing machine mounted on a stationary rectangular frame structure comprised of upper and lower frames, said lower frame comprising beams 1 for its contour, and beams 2 for the upper frame, said frames being in vertical alignment and secured together at their corners by standards 3. There is also provided a pair of intermediate pairs of beams 4 and 5, respectively, the latter transversely crossing each other adjacent a hub 6 as carrying means for the rotatable structure. Said pairs have secured thereto their respective hubs 6 and 7, and in which is journalled a vertically disposed shaft 8, the lower hub having end and side thrust bearings 9 and 10, for the lower end of the shaft while the upper hub has a side thrust bearing 11 secured thereto, the inner race of each bearing being secured to the shaft.

As a means to turn the shaft there is provided a pair of bevel gears 12 and 13, the latter being secured to the end of said shaft while the other gear is mounted on a power driven shaft 14, the power not being shown in the drawings, said bevel gears being concealed by a cylindrical member 15 having a cap plate 16 to cover the outer end thereof, and the said upper bearing having radially disposed but diagonally positioned brace bars 4' extending downward and secured to an annular member 17 that functions as a carrying means for an annular toothed member later described.

The rotatable structure consists of a plurality of radially positioned beams 18, 19, and 20 functioning as spokes, said beams having their inner ends secured to the shaft, while the outer ends of beams 18 terminate at the inner side of an annular wall 21 that is stationarily carried by the lower frame. It will be seen that beam 19 slants upward from the shaft 8 and being secured to the upper beam 20 by bolts 22 whereby an upper wall of a conical annular channel is formed by placing on the under side of the slanting beams an annular plate 23 and being secured thereto while beams 18 have an annular plate 24 secured to their upper sides. The said plates at their inner extremity have an annular diverting head 25 to close the inner terminal edges of said plates, said head having a series of openings spaced there around with a sliding apertured annular plate 25' to partially open and close said openings to vary the current of air through a screen later described. There is also provided a spaced distance downward from the said annular conical plate 23, a conical annular screen element 26 that intersects with annular plate 27 while the outer peripheral edge of the screen is carried by a plurality of standards 26' spaced therearound and secured to the screen element and to said annular plate 27 as shown in Fig. 1, said plate 27 being spaced upward from the said annular plate 24 whereby said channel returns outward and being subdivided radially by a plurality of vertically disposed blades 28 on which said annular plate 27 rests and being secured thereto, the outer terminal end of the lower portion of said subdivided channel being open as an exit for straw passing over the screen and outward through the lower portion of the channel. It will also be seen that the space between the screen and plate 23 upwardly spaced therefrom is likewise subdivided by blades 29, the latter having a downward extension at its lower end to lap on the lower blades and being secured thereto. There is also provided a plurality of radially positioned fingers 30 positioned above the screen element, the outer ends of said fingers being secured to the lower leg A of an annular element Z-shaped in cross section, said lower leg A and web B of the element being the closing means for the outer end of the upper portion of said channel while leg C of the Z-shaped element is secured to the lower leg of said annular member 17, last said member having an offset extending downward and from thence inward along its inner periphery and being secured to a circular head 31 that functions as the enclosure for the top of the structure, the inner peripheral edge of which is secured to the said upper hub 7.

The said head enclosure 31 is spaced upward from a circular head 32 similar in contour to form a threshing chamber for straw and its grain passing there through and being sub-threshed prior to entering between upper and lower toothed elements 33 and 34, annular in form, the latter member being secured to head 32 adjacent its lower periphery while the other toothed member is adjustably carried between the offset and leg of the said annular member 17, the adjustment being vertical to move the upper toothed member toward and from the lower member in spaced relation by bolts 35 vertically positioned, spaced therearound and extending through the web of annular member 17, said bolts having a nut on each side of the web as locking means when the upper toothed member is selectively spaced from the lower toothed member, the teeth of said toothed members extending toward each other but spaced apart and being the final threshing means for the grain that passes there through and outward through said screen element as the structure turns at a high rate of speed, it being understood that the fingers are stationary and slanting downward and crossing a radial plane in close proximity to the screen revolving thereunder as a means to separate the grain from the chaff and straw, and to incline inward movement of the straw. Furthermore the blades 28 slanting from a radial plan as shown in Fig. 3 will create a suction inward through the screen to carry the chaff and straw inward and outward through the exit heretofore described, it being understood that the blades 29 above the screen element slant forward with respect to the direction of rotation to inject a current while blades 28 below the screen element are oppositely disposed to eject current outward, carrying the straw and chaff therewith while the grain is retained in an annular grain chamber as at D. Said grain chamber has a vertically disposed wall 36 extending upward from the outer extremity of plate 24, and being stationarily carried by a plurality of brace elements 36' spaced therearound and secured to the said Z-shaped member heretofore described, the wall to function as a baffle for the centrifugal throw of the grain chamber. The said grain as accumulated will pass outward through a spout 37 as an exit for the grain, said grain spout having an inwardly extending plate 38 slantingly positioned to divert the movement of the grain toward the spout.

Positioned in the circular head 31 is a feed mouth having an upwardly extending hopper 39 to direct the straw into the sub-threshing chamber, said chamber having a plurality of webs 40 slantingly positioned from a radial plane and being secured to the head 32 functioning as the bottom of the threshing chamber while the upper head 31 has a similar plurality of webs 41 secured thereto and oppositely slanting to that of the lower webs, and stationarily retained as the machine revolves, the webs diagonally crossing each other to function as shredding means for the straw and grain heads as fed in said threshing chamber, it being understood that the confronting edges of the said webs are spaced a short distance from each other to avoid a definite shearing tendency but being close enough to mutilate the straw and grain heads.

Secured to the upper and lower heads of the threshing chamber adjacent their peripheries are annular diverting elements 42 to direct the straw and grain heads to enter between the said toothed annular members as a final threshing means for the grain. It will be understood that the upper toothed member and its diverting member are stationarily retained while the lower similar members rotate, the power for rotation being through the medium of the bevel gears and shaft heretofore described. The teeth of the annular members are slantingly positioned from a radial plane to increase ejection of the substance being threshed. It will be seen that the straw and threshed grain will follow through the channels as directed by the arrows shown in said channels.

Modifications may be made as lie within the scope of the appended claims.

Having fully described my invention what I claim as new and desire to secure by Letters Patent is:

1. In a rotary grain threshing machine, a pair of rectangular frames spaced apart vertically and being secured together at their corners by a vertically disposed standard for each corner, upper and lower circular heads spaced apart and axially aligned vertically, the upper head being secured to the frame, a drive shaft axially engaging through the heads and being journalled in the frame, the lower head being secured to the drive shaft and rotatable therewith, a series of webs spaced around each confronting side of the heads to pre-thresh grain, and an annular toothed element carried by the confronting sides of said heads and being external of the webs for final threshing of the grain, one of said elements being adjustably carried by its head, there being an annular V-shaped channel, the legs of which are formed by upper and lower plates to receive the grain as finally threshed, the channel structure rotatable with the lower head, and an annular vertically disposed wall carried by the channel structure to join the inner peripheral edges of the plates, said wall having openings therethrough and spaced therearound, and an annular plate apertured in registry with the wall to slidably engage to open and close the opening in the wall, a screen carried at the lower side of the upper leg of the V-shaped channel through which the grain will pass as separated from chaff and straw, the straw and chaff being discharged outward through the lower leg of the channel, and means to receive the grain as it passes through the screen.

2. In a rotary grain threshing machine, a frame having upper and lower hubs, a drive shaft suitably journalled vertically in the hubs and power means to turn the shaft, a circular threshing chamber having upper and lower heads spaced apart to provide a peripheral discharge from the chamber, the upper head being rigidly secured to the upper hub and frame, the lower head being secured to the shaft and rotatable therewith, hopper means to feed unthreshed grain between said heads, a channel formed by inner and outer walls, the channel being V-shaped in cross section whereby upper and lower portions are formed for the channel the upper portion communicating with the peripheral opening of the threshing chamber, a pre-threshing means positioned in the threshing chamber between the drive shaft and a spaced distance inward from the annular discharge opening, and a final threshing means in the chamber external of the pre-threshing means, said means coacting to thresh grain from straw, or the like, and discharge the same into the said annular channel, a screen carried by the lower wall of the upper portion of the V-shaped channel, and a plurality of blades sub-dividing the channel longitudinally therearound, the blades slantingly positioned as they cross the channel, an annular grain chamber positioned beneath the upper portion of the channel to receive the grain as passed through the screen while the straw or the like moves outward through the lower portion of the channel, the said grain chamber rotatable with the channel, and means to divert the grain from said grain chamber to a spout stationarily supported.

3. In a rotary grain threshing machine, a pair of rectangular frames spaced apart vertically and being secured together at their corners by a vertically disposed standard for each corner, upper and lower flat circular heads, spaced apart, being horizontally disposed and axially aligned vertically, the upper head being secured to the frame, a drive shaft axially engaging through the heads and being journalled in the frame, the lower head being secured to the drive shaft and rotatable therewith, a series of webs spaced around each confronting side of the heads to pre-thresh grain, and an annular toothed element carried by each confronting side of said heads and being external of the webs for final threshing of the grain, an annular structure to form a channel V-shaped in cross section to receive the grain as finally threshed, one portion of the structure to function as a screen through which the grain will pass as separated, while residue separated from the grain is discharged outward peripherally from the channel, there being a grain receiving chamber formed between the legs of the said V-shaped channel and a spout to conduct the grain from its chamber.

JOHN L. BETZEN.